United States Patent [19]

Djuphammar et al.

[11] Patent Number: 5,394,459
[45] Date of Patent: Feb. 28, 1995

[54] CABINET AND POSITION ALLOCATION

[75] Inventors: Hakan O. Djuphammar, Stockholm, Sweden; Sven E. Nilsson, Dallas, Tex.; Ulf Hagstrom, Taby, Sweden

[73] Assignees: Telefonaktiebolaget L M Ericsson, Stockholm, Sweden; Ericsson GE Mobile Communications Inc., Research Triangle Park, N.C.

[21] Appl. No.: 41,169

[22] Filed: Apr. 1, 1993

[51] Int. Cl.$^6$ ............... H04M 3/08; H04M 11/00
[52] U.S. Cl. ........................ 379/15; 379/32; 379/60
[58] Field of Search ............ 379/1, 2, 157.4, 15, 379/94, 59, 60, 26, 32, 9; 324/510, 511, 512, 542, 555

[56] References Cited

U.S. PATENT DOCUMENTS

| | | | |
|---|---|---|---|
| 3,795,860 | 3/1974 | Sylvan | 324/500 |
| 4,694,484 | 9/1987 | Atkinson et al. | 379/59 |
| 4,736,406 | 4/1988 | Molnar | 379/94 |
| 4,857,833 | 8/1989 | Gonzalez et al. | 324/73 R |
| 5,195,085 | 3/1993 | Bertsch et al. | 370/13 |

FOREIGN PATENT DOCUMENTS 2245801A  8/1992  United Kingdom.

*Primary Examiner*—Stephen Chin
*Assistant Examiner*—Kevin Kim
*Attorney, Agent, or Firm*—Burns, Doane, Swecker & Mathis

[57] ABSTRACT

A malfunction position detection system is disclosed for a modular telecommunication facility. Each telecommunication facility is constructed out of a plurality of modular cabinets which are positioned in a station rack. The malfunction position detection system includes switches for setting the position of each cabinet in the station rack. The cabinet position is read off of a bus connected to the switches by a plurality of electronic units connected to the cabinet. The cabinet position is stored in some of the electronic units. As a result, the cabinet position can be sent along with an error message to the cellular system when an error occurs.

36 Claims, 4 Drawing Sheets

CABINET AND POSITION ALLOCATION

BACKGROUND OF THE INVENTION

The present invention relates to a malfunction position detection system and, more particularly, to a malfunction position detection system for a modular telecommunication facility, i.e., a cellular radio base station, a mobile switching center, a private branch exchange, a private automatic branch exchange, ect., wherein the telecommunication facility is constructed out of a plurality of modular cabinets.

A section of a cellular communication system is illustrated in FIG. 1, which illustrates ten cells C1–C10. Normally, a cellular system would be implemented with more than ten cells. However, for the purposes of simplicity, the present invention can be explained using the simplified representations illustrated in FIG. 1. For each cell C1–C10, there is a base station B1–B10, with the same reference number as the corresponding cell. Each base station is responsible for handling calls to and from mobile stations M1–M9 that are located in each respective cell. FIG. 1 also illustrates a mobile services switching center MSC which is connected to all ten base stations by cables or by wireless techniques such as Ericsson Mini Link, a registered trademark of Ericsson. The mobile services switching center is also connected to a fixed public switching telephone network or a similar fixed network. The mobile services switching center controls each base station.

In large electronic systems such as cellular telephone communication systems such as the one illustrated in FIG. 1, it is necessary to package large amounts of equipment. To package large amounts of electrical equipment such as equipment typically belonging to mobile switching centers or radio base stations of cellular telephone communication systems, i.e., printed board assemblies, combiners, high powered equipment, ac/dc equipment, antennae near parts, distribution blocks, power connection blocks, power splitters, etc., it is desirable to provide a modular packaging system that simplifies system design, customization, and expansion, as well as simplifying system construction and maintenance.

One such modular packaging system is disclosed in U.S. patent application Ser. No. 07/990,515 to Anderson et al. entitled "Modular Packaging System," which is assigned to the same assignee as the present invention. In the disclosed modular packaging system, two or more modules are arranged horizontally or vertically relative to one another. Each module includes electrical equipment, a cabinet in which the electrical equipment is disposed, and a fan assembly for forcing air through the cabinet to cool the electrical equipment. A base station is built by using a plurality of these cabinets. All cabinets have a uniform design and size which gives each base station its modularity.

Each base station in a mobile cellular system usually is comprised of several functional sections: a control section; a modem section; an antenna near section; and a support section. The control section handles the communication between the base station and the mobile services switching center (MSC). In addition, the control section contains the hardware for radio traffic control, statistics, and control of the modem support and antenna near sections. The control section can also handle communication and control of microbase station equipment. The control section contains software loadable hardware. The modem section converts speech and digital information into radio waves and vice versa. The modem section also performs measurements to determine radio transmission quality. The modem section consists of non-loadable hardware, however the program memory of a dual mode transceiver device can be changed by a command from the mobile services switching center. The antenna near section contains equipment associated with forward and reverse radio frequencies such as amplifiers, combiners and multicouplers. The antenna near section can also contain equipment for looping of radio signals, output power measurement, RF calibration, external alarm collection, and control of external equipment. The antenna near section consists of non-loadable hardware. However, the program memory of some antenna near section devices can be changed by a command from the mobile services switching center. Finally, the support section provides a power supply to the base station hardware. The support section consists of ac/dc converters, control equipment, and battery backup. The support section consists of non-loadable hardware. However, the program memory of a power control unit can be changed by a command from the mobile services switching center.

As in almost all electrical systems, malfunctions or system errors can occur. When a malfunction occurs in a cellular radio base station or another telecommunication facility, one known method for detecting the malfunction so that the malfunction can be fixed is to use malfunction detecting diagnostics at the station. However, running test programs on site at a base station often involves disconnecting the entire base station from operation. Since it is not desirable to disconnect a base station from operation, it is an object of the present invention to provide an apparatus and method for detecting malfunctions in a radio base station wherein the malfunction is detected and recorded. This information can then be used to ease repairs, trace system errors and provide information for further product improvements.

SUMMARY OF THE DISCLOSURE

In accordance with one aspect of the present invention, a malfunction position detection system is disclosed for a modular telecommunication facility such as a cellular radio base station, a mobile switching center, a private automatic branch exchange, ect. Each telecommunication facility or station is constructed out of a plurality of cabinets which are positioned in a station rack. The malfunction position detection system includes a switch means for each cabinet for setting the position of said cabinet in the station rack. The malfunction position detection system also includes a bus for transferring the cabinet position to a plurality of electronic units connected to each cabinet and a memory means on at least one of said electronic units for storing the cabinet position. As a result, each electronic unit with the memory means can poll the bus on a regular basis to determine the cabinet position set by the switch device. As a result, when a malfunction occurs, the cabinet position can be sent to a telecommunication switching center wherein the fault is recorded in a fault record.

In another embodiment of the present invention, each fleetronic unit is connected to the bus by a backplane connector. Each backplane connector contains a means for forming a code unique to each connector in each cabinet wherein the code indicates the backplane connector's position in the cabinet. As a result, each electronic unit with a memory means can use the connector's position to indicate the unit's position in the cabinet. In addition, product numbers and version numbers for each unit can also be stored in a memory means on each unit so that the cabinet position, unit position, product numbers and version numbers can be sent to a mobile services switching center either regularly or when an error is detected.

In another embodiment of the present invention, a method for detecting the position of a malfunction in a modular station in a telecommunication system is disclosed. First, a cabinet position is set for each cabinet in a station rack. Then, at least one of a plurality of electronic units reads the cabinet position and stores the position information. The position information is then transferred to a processor in the telecommunication switching center, where it is stored, when a fault is detected in one of the electronic units. In addition, a position for each electronic unit in a cabinet can also be set and sent to the processor in the telecommunication switching center when an error is detected.

BRIEF DESCRIPTION OF THE DRAWINGS

The features and advantages of the present invention will be understood by reading the following detailed description in conjunction with the drawings in which like numerals indicate like elements and in which.

DETAILED DESCRIPTION OF THE DISCLOSURE

While the following description is in the context of cellular communication systems, it will be understood by those skilled in the art that the present invention may be applied to other communication systems.

Figure 1:
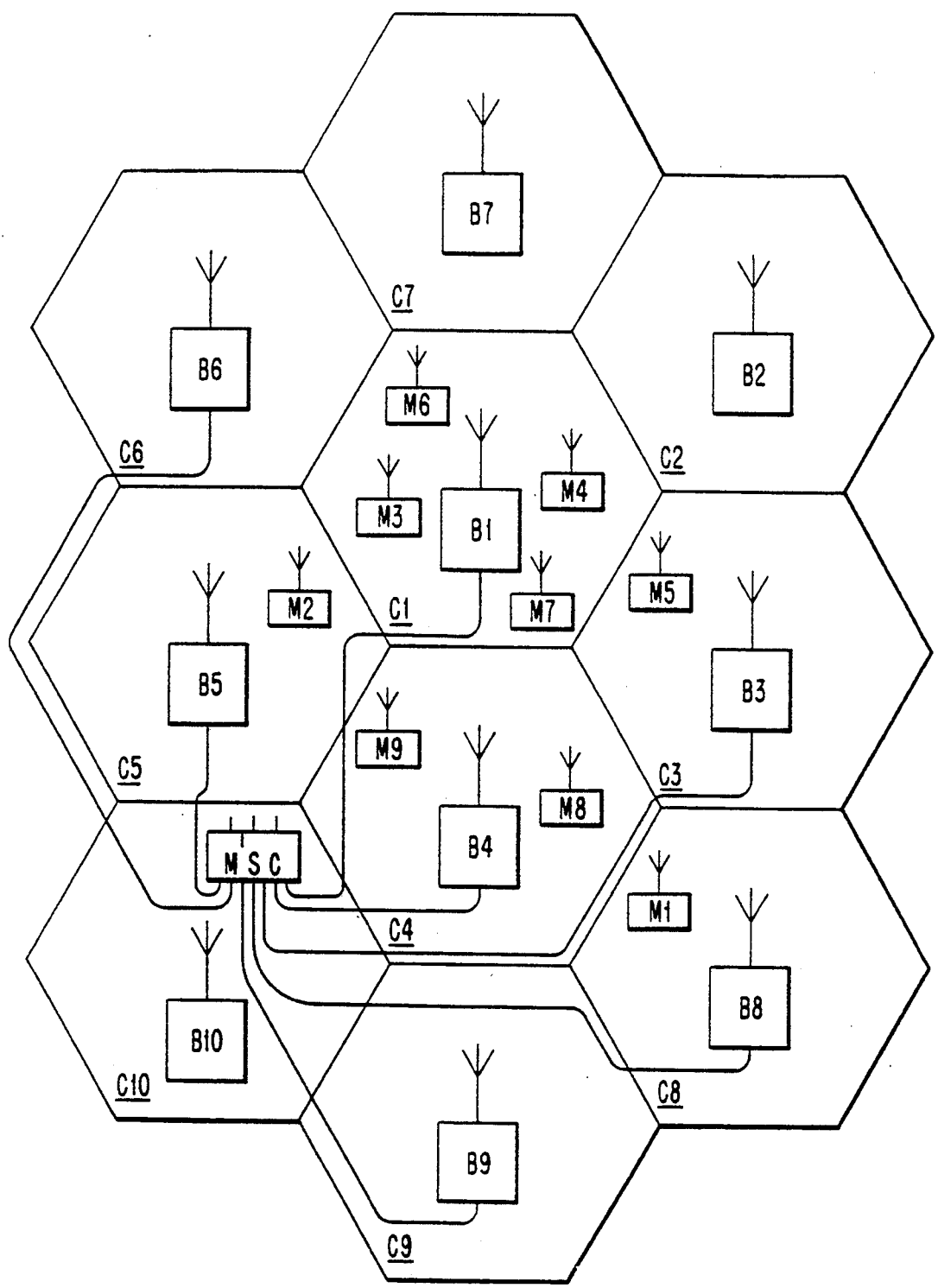
FIG. 1 illustrates a typical cellular communication system.
Figure 2:
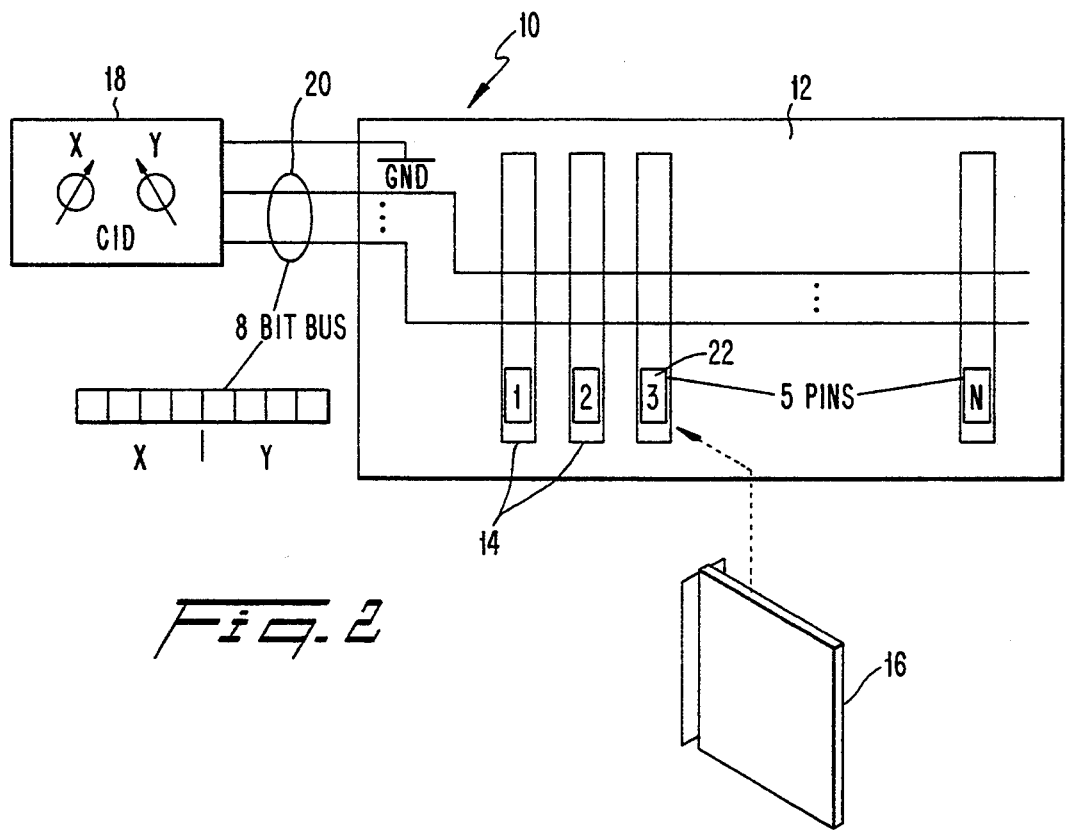
FIG. 2 illustrates a schematic drawing of a fault handling system for one cabinet according to one embodiment of the present invention.
Figure 4:
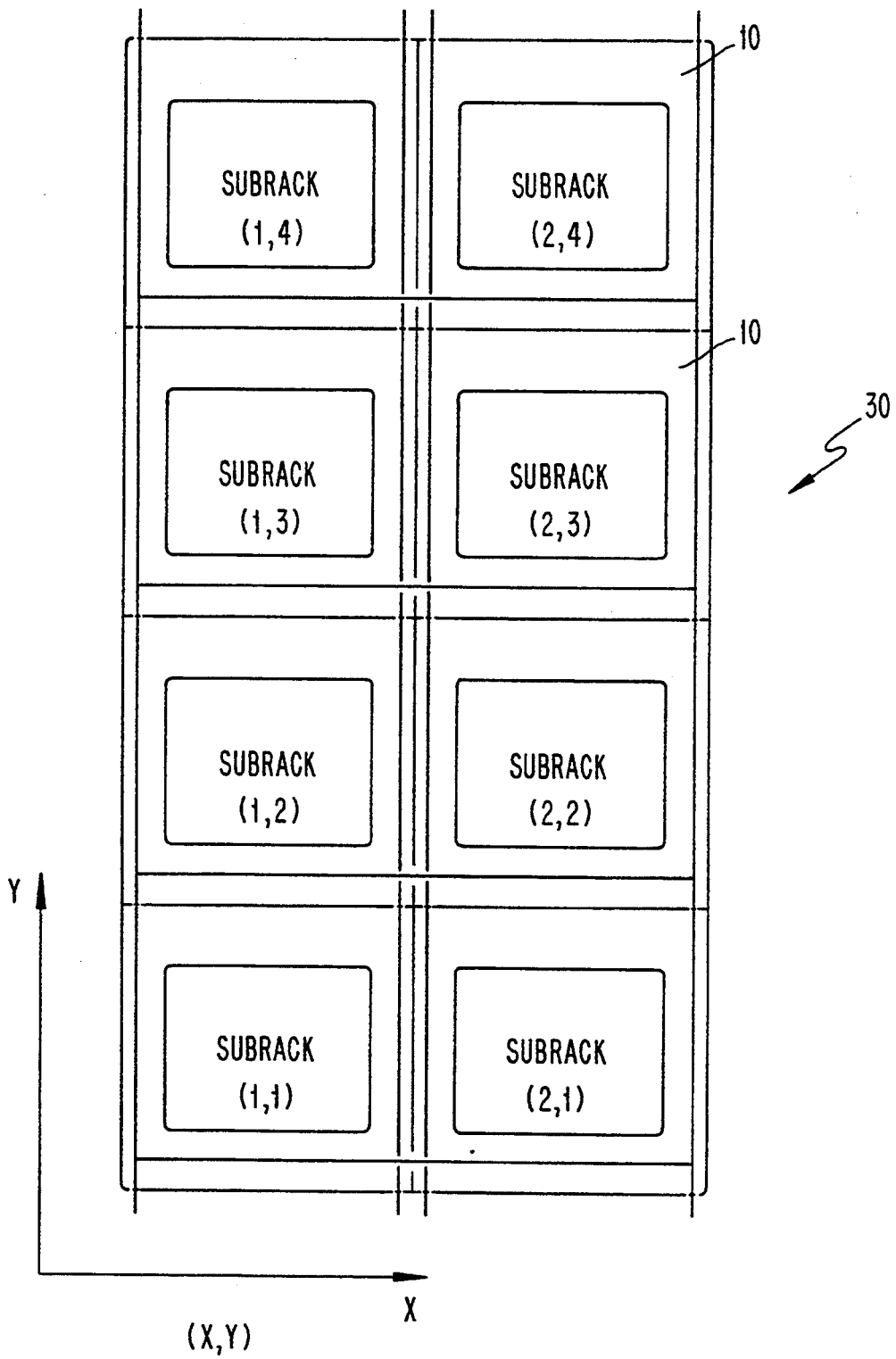
FIG. 4 illustrates a station rack with cartesian recognition of the cabinet schematically shown.

FIG. 2 illustrates a modular cabinet 10 according to one embodiment of the present invention wherein a plurality of modular cabinets 10 are used to construct a telecommunication facility in a telecommunication system. The telecommunication facility or station can be a cellular base station or a telecommunication switching center such as a mobile switching center, a private branch exchange, a private automatic branch exchange, ect., but the present invention is not limited thereto. The modular cabinets 10 are stacked in columns and or rows in a station rack. As is illustrated in FIG. 4, a station rack 30 contains a plurality of modular cabinets that are stacked in rows and columns. Each modular cabinet 10 has a cabinet backplane 12. The backplane 12 has a plurality of connectors 14 which connect electronic units 16 to the cabinet. The electronic units can be printed circuit board assemblies or other electronic equipment. The printed circuit board assemblies 16 contain electronic equipment necessary to form an operational base station.

Each modular cabinet 10 also contains a setting or switch device 18 otherwise known as the cabinet identity switch. The cabinet identity switch 18 is used to identify the position of each modular cabinet in each station. In one embodiment of the present invention, the cabinet identity switch 18 has two rotary or thumb wheel switches which have been denoted as X and Y, respectively. The X switch determines in which column the cabinet is located in and the Y switch determines in which row the cabinet is located. As a result, the position of each cabinet in the station rack can be set.

Each modular cabinet also includes a bus 20. In the present embodiment, the bus 20 is an eight bit bus, but the present invention is not limited thereto. The bus 20 is connected to each electronic unit through the connectors 14. In addition, the cabinet identity switch 18 is connected to the bus 20 by a plurality of conductors which are not illustrated. The cabinet identity switch sends a signal over the bus 20 indicating the cabinet position set by the cabinet identity switch 18. In one embodiment of the present invention, one nibble is used to indicate the position set by the X switch and one nibble is used to indicate the position set by the Y switch. Since the cabinet identity switch 18 and each of the circuit board assemblies are connected to the bus 20, some of the electronic units can poll the bus 20 to determine the cabinets position from the cabinet identity switch 18. One of ordinary skill in the art will recognize that not all of the electronic units will be capable of polling the bus to determine the cabinet's position. The cabinet position is then stored in a memory on the printed circuit board for future reference.

Furthermore, each of the backplane connectors 14 have a pin configuration or array, for example, a five pin configuration or array, which indicates the connector's position within the cabinet 10. As a result, the pin configuration or array can be used to indicate the relative positions of the electronic units 16 in the cabinet according to a binary code. The code is tabulated below in Table 1.

TABLE 1

| Pin | 5 | 4 | 3 | 2 | 1 | Pos. # |
|---|---|---|---|---|---|---|
| | 0 | 0 | 0 | 0 | 0 | Not used |
| | 0 | 0 | 0 | 0 | 1 | 1 |
| | 0 | 0 | 0 | 1 | 0 | 2 |
| | 0 | 0 | 0 | 1 | 1 | 3 |
| | . | . | . | . | . | . |
| | 1 | 1 | 1 | 1 | 1 | 31 |

0 = Short circuit to GND
1 = Not connected, done through a Pull-Up on board connection.

A pin generates a 0 signal when the pin is short circuited to ground and a pin generates a 1 signal when the pin is not connected. This can be accomplished through a Pull-up resistor on the board connection in a known manner. For example, a circuit board assembly 16 which is connected to the connector 14 with a pin configuration of 01000 would be located at position No. 8 within the cabinet 10. Each circuit board regularly reads and stores its relative position number generated by the connector 14 to which it is connected.

As noted above, not all of the electronic units 16 are capable of reading the unit's position or the cabinet's position. For instance, fan units and multicoupler units can not read the respective positions. However, the circuit board that controls, for instance, a fan unit can read the fan's position so that when a fault occurs in the fan unit, the fan controller can report the fault as well as the fan's position. However, the following units are capable of reading the unit's position and the cabinet's position: extension module regional processor speech bus interface unit; dual-mode transceiver unit; a cabinet power amplifier controller unit; a combiner tuning controller; a single carrier power amplifier unit; an alarm module; and a radio frequency test loop. It will be recognized by one of ordinary skill in the art that units other than the ones listed above may also be included in the station.

In addition to the unit position and the cabinet position, the above-listed units can also have the following information stored for remote access: article numbers; a serial number; an article function code which indicates incompatibility with old software; a revision function code which indicates functional upgrading with new software or hardware; and system function codes which can be used for special applications. The above information is programmed into each unit during manufacturing and is hardware dependent.

The electronic units read and store their respective unit position and the cabinet position at regular intervals. The stored information is then sent to a processor in the telecommunication switching center responsible for the station when a fault is detected in a unit. In addition, a fault code, which indicates what type of fault has occurred, can also be sent to the mobile services switching center when a fault is detected. The fault codes are stored in a device's memory and can be accessed by the device's software when a fault is detected. For example, if an end transistor of an output stage in a device is faulty, the device detects the fault in a known manner and dispatches an error signal which includes a fault code which indicates that an end transistor is faulty. In addition, the stored information for an electronic unit can be sent to a processor when an alarm is detected. For example, the alarm module detects external alarms such as fire alarms. When a fire alarm is activated, the alarm module sends an error signal to the telecommunication switching center indicating that the fire alarm has been activated.

In the one embodiment of the present invention, the telecommunication switching center is a mobile services switching center which contains an Ericsson AXE switching system, but the present invention is not limited thereto. The AXE system is implemented in a mobile services switching center designated for cellular communication with cellular features added. In the AXE system, a plurality of processors are arranged in a hierarchial manner with a supervising central processor followed by regional processors and device processors. In the present invention, a new processor level, the support processor level, is added to the hierarchy. The support processor level is used for fault handling. If an error is detected in a device, a fault signal containing the cabinet number, the board position number, the serial number, the revision number and a fault code is dispatched upwards in the processor hierarchy towards the central processor. Upon a major fault, the closest processor level will dispatch a fault or error signal to the central processor. The error message is processed by the mobile services switching center in order to generate an error report. The mobile services switching center is able to perform filtering of multiple error messages and can also initiate tests in a known manner when errors occur. All of the error reports are stored in an error record. When an error occurs at a base station, the error message generated at the base station contains the faulty unit's cabinet number, position number, product number, revision number, and a fault code. In addition, the error report can also specify what type of supervision or monitoring was used to detect the fault. Also, the error reports are accessible on a per site or microbase basis for regular maintenance purposes.

In another embodiment of the present invention, a telecommunication switching center is constructed out of a plurality of modular cabinets. The cabinet position for each of the cabinets is set according to each cabinets position in the station rack. At least one of a plurality of electronic units connected to each cabinet reads and stores the cabinet position. When a fault is detected, the stored information is sent to a processor in the next processor level above the processor level which contains the fault. For example, if a fault is detected in the device processor level, an error signal is set to a processor in the regional processor level. However, if a fault occurs in the top processor level, an error signal is sent to one of the top processors which has not experienced the fault.

Figure 5:
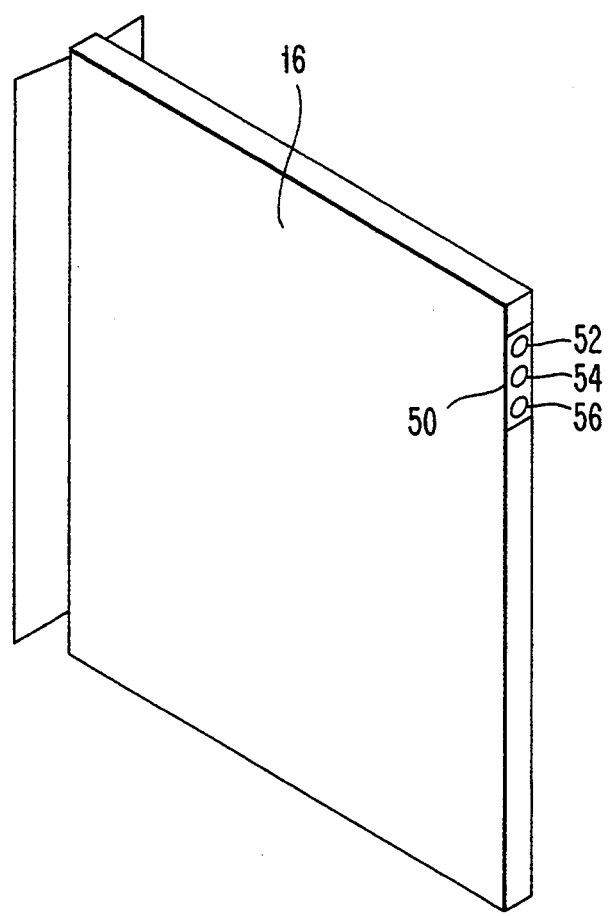
FIG. 5 illustrates a circuit board according to one embodiment of the present invention.

In addition, each of the electronic units can be equipped with a plurality of light emitting diodes (LED) 50 which can indicate a variety of conditions as is illustrated in FIG. 5. The LEDs 24 can be placed in the upper end of a circuit board assembly and in the upper left corner of a hardware unit. In one embodiment of the present invention, all active units contain one LED 52 for indicating whether the power is on and another LED 54 for indicating whether an error or fault has occurred. In addition, all units which contain either a device processor or a support processor also have an LED 56 for indicating the status of the unit.

Generally, when the error LED 54 is lit, an error is present. However, if the unit contains a device processor or a support processor, the error LED 54 may be on, off, or flashing depending upon the state of the unit. When a device is powered up, the device may initiate a self-test. During the self-test, the error LED 54 will flash for at least one second, even if the time for the power up and test sequence is less than one second. The testing may be an initiated self test or a test from a system point of view where the device functions are tested in operation. However, the error LED 54 will only flash during tests associated with power up and not during periodical tests performed under normal operation. If an error is detected during the self test, the error LED 54 will remain lit. In addition, the error LED 54 will flash with a frequency of 1 Hz if communication is lost. The status LED 56 indicates whether the device is blocked or deblocked. In other words, the status LED 56 indicates whether the device is out of operation (blocked) or currently operating (deblocked). Typically, the status LED 56 is lit when the device is deblocked and is switched off when the device is blocked. Also the status LED 56 flashes when the device is deblocked or when the device is blocked and is being tested. The flashing frequency is set to 15 Hz. The duty-cycle of the flashing is generally set at 50%, however the duty-cycle can also be set at 20%, 40%, 60%, or 80% depending upon whether the device supports traffic for more than one carrier channel. Finally, the status LED 56 can also be switched off by a watch dog signal which also resets the status LED 56 in the processor register. The watch dog signal resets the processor when the software used by the processor is not functioning properly.

Figure 3:
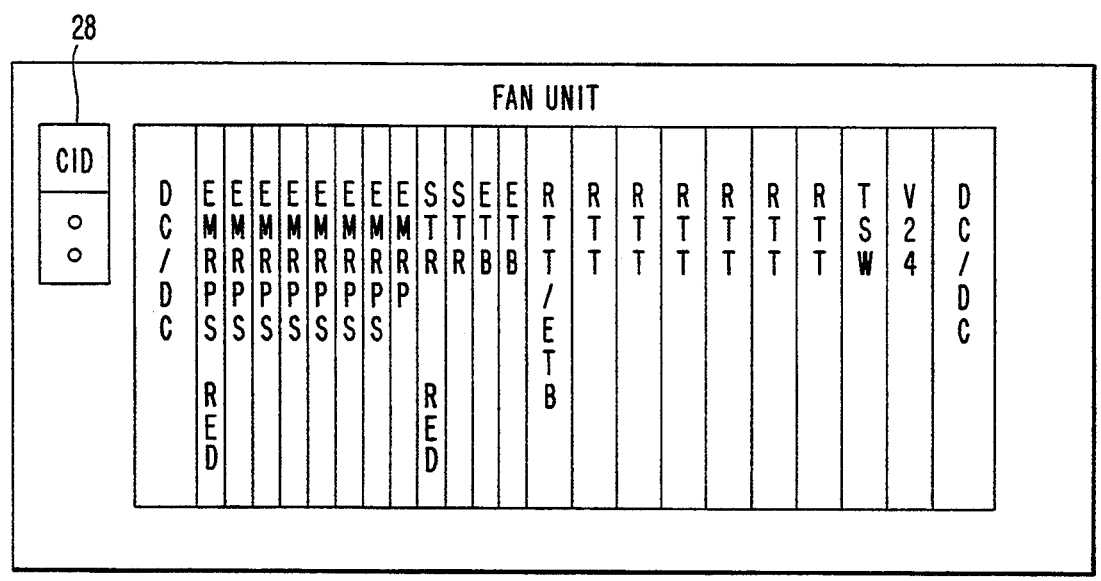
FIG. 3 illustrates one possible equipped cabinet according to one embodiment of the present invention.

As illustrated in FIG. 3, each cabinet 10 is also equipped with at least two light emitting diodes 28. The first LED indicates whether the power is on and the second LED indicates whether an error has occurred in the cabinet. Specifically, the power LED is lit when power is supplied to the cabinet and the error LED is lit when any circuit board assembly or unit in the cabinet indicates that an error is present.

It is, of course, possible to embody the invention in specific forms other than those described above without departing from the spirit of the present invention. The embodiments described above are merely illustrated and should not be considered restrictive in any way. The scope of the invention is given in the pending claims, rather than the preceding description, and all variations and equivalents which fall within the range of the claims are intended to be embraced therein.

What is claimed is:

1. A malfunction position detection system for a modular station in a telecommunication system, said station constructed out of a plurality of cabinets, comprising:
    a switch means for each cabinet for setting the position of each cabinet in a station rack;
    a bus for transfering said position to a plurality of electronic units connected to each cabinet;
    memory means on at least one of said electronic units for storing said cabinet position; and
    means for detecting a fault in said station, wherein said cabinet position is sent to a telecommunication switching center when a fault is detected.

2. A malfunction position detection system according to claim 1, wherein said station is a cellular radio base station.

3. A malfunction position detection system according to claim 1, wherein said station is a telecommunication switching center.

4. A malfunction position detection system according to claim 3, wherein said telecommunication switching center is a mobile switching center.

5. A malfunction position detection system according to claim 1, wherein said switch means includes a plurality of thumb wheel switches which set the position of the cabinet in the station rack.

6. A malfunction position detection system according to claim 5, wherein one thumb wheel switch sets the horizontal position of said cabinet and another thumb wheel switch sets the vertical position of said cabinet.

7. A malfunction position detection system according to claim 1, wherein said switch means includes a plurality of rotary switches which set the position of the cabinet in the rack.

8. A malfunction position detection system according to claim 7, wherein one rotary switch sets the horizontal position of said cabinet and another rotary switch sets the vertical position of said cabinet.

9. A malfunction position detection system according to claim 1, wherein said switch device is connected to said bus by a plurality of conductors.

10. A malfunction position detection system according to claim 1, wherein each electronic unit is connected to said bus by a backplane connector.

11. A malfunction position detection system according to claim 10, wherein each backplane connector includes means for forming a code that indicates a connector's position in the cabinet.

12. A malfunction position detection system according to claim 11, wherein said means is a plurality of pins.

13. A malfunction position detection system according to claim 11, wherein at least one of said units reads and stores the connector's position to which the unit is connected.

14. A malfunction position detection system according to claim 1, wherein memory means on each unit also stores the unit's product number and version number.

15. A malfunction position detection system according to claim 14, wherein the cabinet position, circuit card position, product numbers, and version numbers are sent to a telecommunication switching center when a fault is detected.

16. A malfunction position detection system according to claim 15, wherein a record is kept of said cabinet position, circuit card position, product numbers, and version numbers when a fault is detected in said base station.

17. A malfunction position detection system according to claim 1, wherein each cabinet includes a plurality of light emitting diodes for indicating different conditions of the cabinet.

18. A malfunction position detection system according to claim 17, wherein one light emitting diode indicates whether the cabinet has power and another light emitting diode indicates whether a fault has occurred in the cabinet.

19. A malfunction position detection system according to claim 1, wherein each of said units includes a plurality of light emitting diodes for indicating different conditions of the unit.

20. A malfunction position detection system according to claim 19, wherein a first light emitting diode indicates whether the unit has power, a second light emitting diode indicates whether a fault has occurred in said unit, and a third light emitting diode indicates the status of said unit.

21. A method for detecting the position of a fault in a modular station in a telecommunication system, comprising the steps of:
    setting a cabinet position for each of a plurality of cabinets situated in a station rack;
    reading said cabinet position at at least one of a plurality of electronic units connected to each cabinet;
    storing said position information at at least one of said units;
    transferring said stored information for a particular unit to a processor in a telecommunication switching center when a fault is detected in said unit; and
    storing said transferred information at said telecommunication switching center.

22. A method for detecting the position of a fault according to claim 21, further comprising the steps of:
    setting a unit position for each of said plurality of electronic units contained in each cabinet;
    reading said unit position at at least one of said units; and
    storing said unit position at at least one of said units.

23. A method for detecting the position of a fault according to claim 22, wherein each unit also stores a product number and a version number which is also transferred to said telecommunication switching center when said fault is detected.

24. A method for detecting the position of a fault according to claim 21, wherein a fault code number identifying the type of fault is also transferred to said telecommunication switching center when the fault is detected.

25. A method for detecting the position of a fault according to claim 21, further comprising the step of;
generating an error log from said transferred information.

26. A method for detecting the position of a fault according to claim 21, wherein each cabinet's position is set by a plurality of thumb wheel switches.

27. A method for detecting the position of a fault according to claim 21, wherein said cabinet position is read off of a bus.

28. A method for detecting the position of a fault according to claim 27, wherein each electronic unit is connected to said bus by a backplane connector.

29. A method for detecting the position of a fault according to claim 28, wherein each backplane connector sets each unit's position.

30. A method for detecting the position of a fault according to claim 21, further comprising the step of:
indicating a plurality of conditions of each cabinet using a plurality of light emitting diodes connected to each cabinet.

31. A method for detecting the position of a fault according to claim 21, further comprising the step of:
indicating a plurality of conditions of each electronic unit using a plurality of light emitting diodes connected to each electronic unit.

32. A method for detecting the position of a fault according to claim 21, wherein each cabinet's position is set by a plurality of rotary switches.

33. A method for detecting the position of a fault according to claim 21, wherein said station is a cellular radio base station.

34. A method for detecting the position of a fault according to claim 21, wherein said station is a telecommunication switching center.

35. A method for detecting the position of a fault according to claim 34, wherein said stored information is transferred to a processor in a processor level above the processor level which contains the fault.

36. A method for detecting the position of a fault according to claim 34, wherein said stored information is transferred to a processor in the processor level which contains the fault.

* * * * *